May 2, 1961             H. ORNER             2,982,145
RECIPROCABLE FEED MECHANISM
Filed July 14, 1958             3 Sheets-Sheet 3
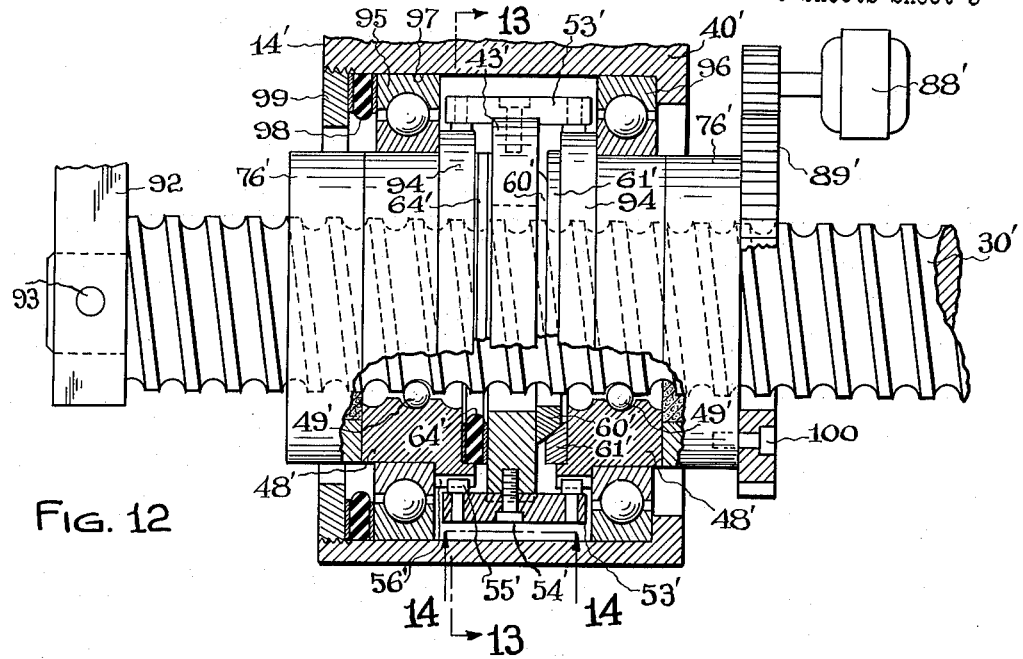
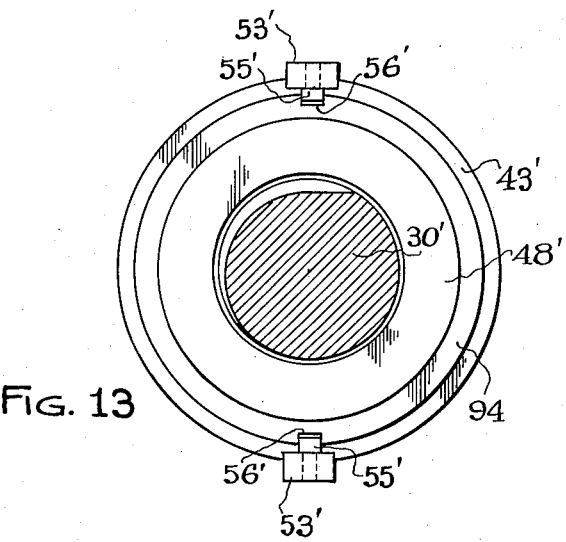
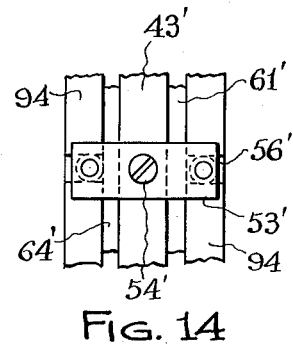
INVENTOR.
HARRY ORNER
BY
ATTORNEY United States Patent Office 2,982,145
Patented May 2, 1961

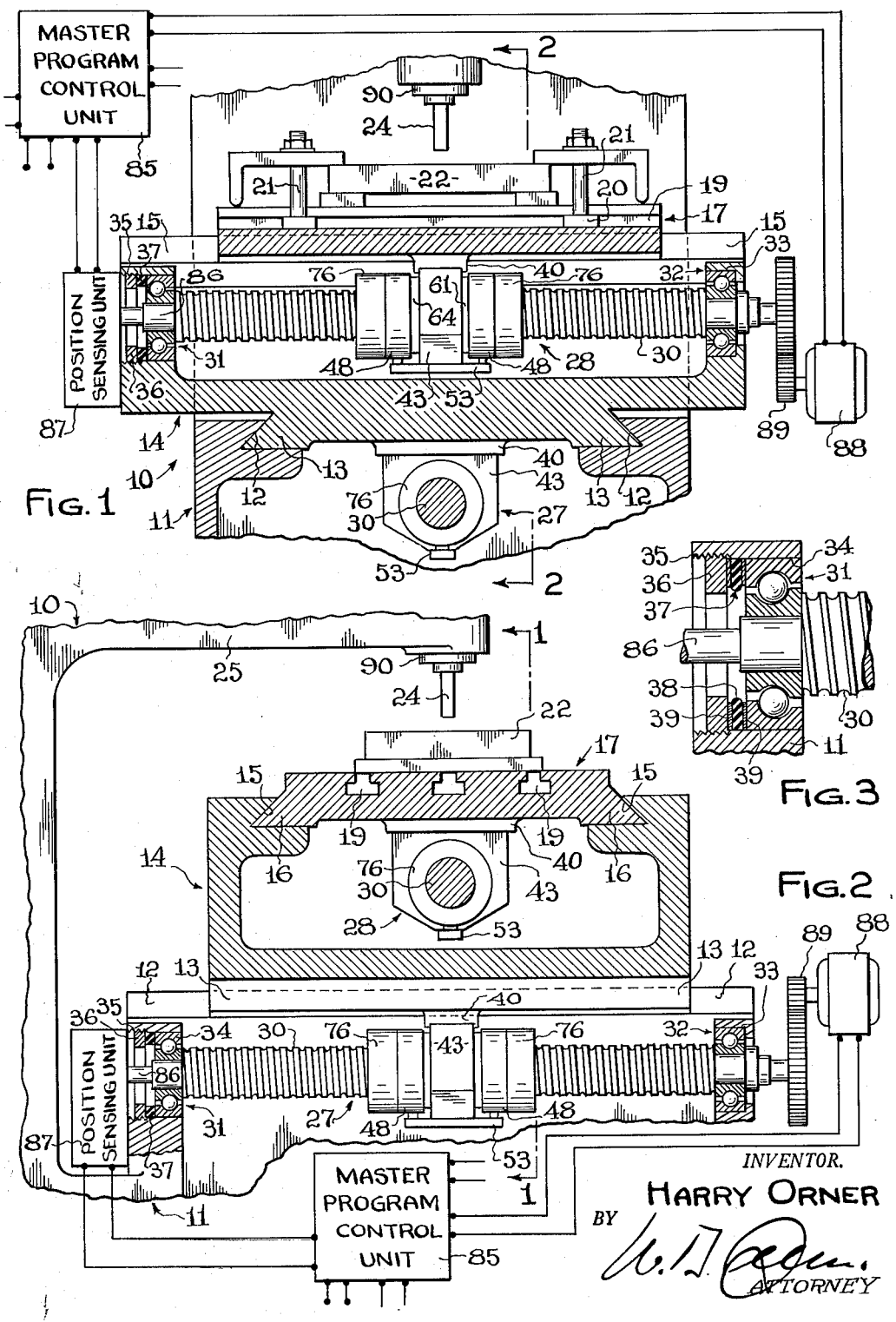

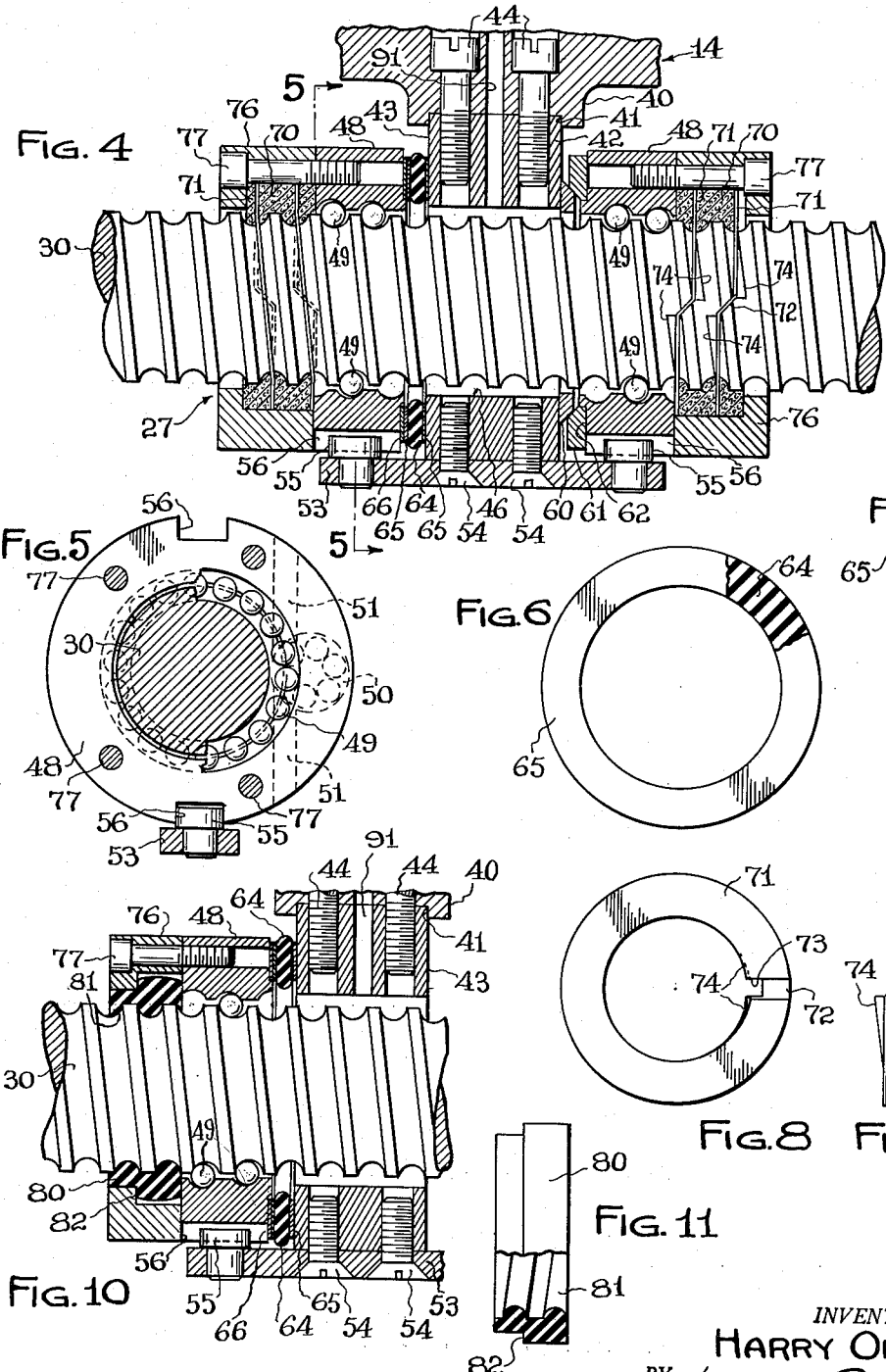

2,982,145
RECIPROCABLE FEED MECHANISM
Harry Orner, 2479 Glen Canyon Road, Altadena, Calif.
Filed July 14, 1958, Ser. No. 748,538
28 Claims. (Cl. 74—424.8)

This invention relates to ball bearing nut and screw mechanisms and more particularly to an improved reciprocable feed mechanism characterized by the provision of preloaded balls, the elimination of all backlash and operating with such high precision that a predetermined angular movement of one component in either direction is accompanied by a related precise movement of the other element. Owing to the ultra-high precision with which transition can be made between linear and rotary movements, the mechanism of this invention is applicable to a great variety of controls including those under the supervisory management of servo-systems. One example is the use of a pair of the ball bearing nut and screw mechanisms according to this invention to control the movement of a pair of carriages movable in parallel planes and at right angles to one another as necessary to position a workpiece and a cutting tool in a machine tool to perform a cutting operation along a complex path. It will be recognized, however, that this is merely exemplary of one application of the motion translation device here provided, and embodying important features of the mechanism disclosed in my co-pending application for United States Letters Patent Serial No. 559,283, filed January 16, 1956, entitled Pre-Stressed Ball Bearing Screw and Nut Device, granted July 15, 1958, as Patent 2,842,978.

Numerous designs have been proposed heretofore for translating rotary motion to linear motion with high precision. However, the results obtainable have been erratic and subject to many shortcomings obviated by the present invention. For example, it has not been feasible to control the feed of a workpiece toward and away from a cutting tool with any acceptable degree of precision due to backlash and lost motion unavoidably present between the relatively moving parts of prior feed mechanisms. Such seemingly insignificant factors as variations in the thickness of lubricant films between the parts lead to errors not tolerable in high precision equipment.

By the present invention there is provided feed control mechanism for a pair of interconnected carriages movable transversely of one another, either separately or simultaneously with ultra-high precision. To this end the carriages are interconnected and arranged to be driven linearly by a pair of ball bearing nut and screw mechanisms arranged at right angles to one another with one component of each mechanism arranged to be rotated by a precision selsyn motor and effective in response to rotary movement of any magnitude in either direction to produce a predetermined linear movement. According to one mode of practicing the invention, the linear resultant movement occurs in the component rotated, whereas in another mode, the linear motion occurs in an associated component. A feature of each mechanism is the provision of means for preloading balls interconnecting the load transmitting components and for maintaining such preload independently of externally applied loads.

Another important feature of the ball bearing nut and screw mechanism is the use of ball bearing mounting means for one of the principal components utilizing anti-friction bearing means preloaded in a manner to prevent linear movement of that component relative to the supporting structure. According to one mode of constructing the mechanism, such preloaded bearing supports are provided for the opposite ends of the screw, whereas in a second and alternate design of the mechanism the preloaded mounting means supports the nut housing against movement relative thereto.

Another important feature of the invention is an arrangement for preloading the balls between the relatively moving parts of the nut and screw mechanism under a predetermined stress and locking the parts rigidly in this condition while leaving each nut free for limited relative movement as may be desirable for the independent alignment of each relative to the common screw extending therethrough. This preloading and locking mechanism is designed for precise assembly under carefully controlled conditions, the resulting assembly being thereafter mountable upon and demountable from an operating environment as a unit without disturbing the preloaded relationship of the components.

Another feature of the design is the provision of lubricant sealing and distributing means in association with the ball bearing nut and screw mechanism effective in maintaining a substantially uniform film of lubricant in the path of the preloaded balls while holding captive a supply of lubricant within the mechanism. The described seal makes it feasible to maintain a small reservoir of lubricant within the assembled unit despite the spacing of the nuts from the screw by the intervening circuit of balls.

Accordingly, it is a primary object of this invention to provide an improved high precision mechanism for translating rotary motion to and fro linear motion with precision and without backlash.

Another object of the invention is the provision of ball bearing nut and screw mechanism adapted to be assembled with the balls thereof under a predetermined preload and featuring means by which this unitary assembly can be attached and detached from an operating environment without disturbing the preloaded condition of the components.

Another object of the invention is the provision of a universal movement feed mechanism having a base plate movable to an infinite number of precise positions within the plane thereof as determined by control impulses fed to a plurality of actuating devices controlling the position thereof.

Another object of the invention is the provision of a ball bearing screw and nut mechanism featuring a plurality of nuts held assembled to a common screw by independent circuits of recirculating balls held rigidly locked in predetermined relatively rotated positions such that the balls of each circuit are preloaded to eliminate backlash while leaving each nut free for limited movement relative to the screw without disturbing the preload condition of said balls.

Another object of the invention is the provision of a lubricant seal and distributing means for use between a nut and the ball raceway of a screw held assembled to said nut by recirculating balls.

Another object of the invention is the provision of a mounting for the opposite ends of the screw in a ball bearing nut and screw mechanism and featuring preloaded anti-friction thrust bearing means supporting the screw for free rotary movement while restraining the same against all axial movement.

Another object of the invention is the provision of a motion translating means employing ball bearing nut and screw devices so constructed that precisely measured relative rotary movements of the components thereof in either direction effects a predetermined linear movement in a direction directly determined by the direction of rotary movement.

These and other more specific objects will appear upon reading the following specification and claims and upon considering in connection therewith the attached drawings to which they relate.

Referring now to the drawings in which preferred embodiments of the invention are illustrated:

Figure 1 is a transverse sectional view through the workpiece carriage assembly of a machine tool having incorporated therein the present invention, the view being taken along line 1—1 on Figure 2;

Figure 2 is a transverse sectional view similar to Figure 1 and taken along line 2—2 on Figure 1;

Figure 3 is a fragmentary transverse sectional view on an enlarged scale taken through the preloaded bearing support for one of the feed screws;

Figure 4 is a longitudinal sectional view on an enlarged scale through one of the ball bearing nut and screw assemblies;

Figure 5 is a transverse sectional view taken along line 5—5 on Figure 4;

Figure 6 is an elevational view of the resilient ring assembly employed in maintaining the ball bearing nut and screw mechanism resiliently preloaded, a portion of one of the face rings thereof being broken away;

Figure 7 is an edge elevational view of the resilient ring shown in Figure 6, a portion of the ring being cut away to show constructional details;

Figure 8 is an end elevational view of the wiper ring forming a component of the combined seal and lubricant distributor device according to one preferred embodiment;

Figure 9 is a view from one outer edge of one of the wiper rings shown in Figure 8, and as viewed from the left-hand side of Figure 8;

Figure 10 is a fragmentary sectional view through one end of the nut and screw assembly employing an alternate form of embodiment of the lubricant seal and distributor;

Figure 11 is an elevational edge view of the lubricant seal and distributor unit employed in the Figure 10 construction with portions thereof broken away;

Figure 12 is an elevational view from one side of the ball bearing and screw mechanism according to another embodiment of the invention, parts being broken away to show details of the structure and featuring a rotary nut assembly and a stationary screw rigidly supported at its opposite ends;

Figure 13 is a fragmentary transverse sectional view taken along line 13—13 on Figure 12; and Figure 14 is a fragmentary view on an enlarged scale showing the locking means for holding the nuts in a predetermined preload position as viewed from line 14—14 on Figure 12.

Referring to a first preferred mode of practicing the invention, there is shown a machine tool designated generally 10 having a main bed 11 provided with accurately machined ways 12 snugly and slidably seating therein the complementarily shaped ways 13, 13 of a carriage 14. Extending transversely across the upper side of carriage 14 and at right angles to ways 13, 13 is a pair of female ways 15, 15 similarly accurately seating male ways 16, 16 of a workpiece supporting table or carriage 17. The latter may be provided with suitable means, such as the T-channel 19, 19 for receiving the heads 20 of clamping bolts 21 employed in rigidly clamping a workpiece 22 while undergoing machining. A power-driven rotary cutting tool 24 of any desired character is suitably supported in known manner by a bracket 25 rigid with the machine tool bed 11.

Associated with each of carriages 14 and 17 are generally similar ball bearing nut and screw mechanisms respectively designated generally 27 and 28, mechanism 27 being interposed between tool bed 11 and carriage 14, and mechanism 28 being interposed between carriage 14 and workpiece carriage 17. It is pointed out that these mechanisms are substantially identical and for this reason a detailed description of one will suffice for both. Each includes a high-precision screw 30 having its opposite ends rotatably supported in thrust bearing assemblies 31, 32. As here shown, bearing assembly 32 has its outer race seated at the inner end of a bore 33 opening into the inner surface of tool bed end wall 11. Thrust bearing 31 has a snug sliding fit in a bore 34 formed in the opposite end wall of bed 11, this bore being provided at its outer end with threads 35 adjustably seating a clamping ring 36. Interposed compressively between clamping ring 36 and the outer race of thrust bearing 31 is a resilient ring 37 here shown as comprising a thick ring of elastomeric material having its opposite radial faces preferably bonded to metal face rings 39 (Figure 3).

From the foregoing it will be recognized that the antifriction balls or other rolling elements of thrust bearing assemblies 31, 32 can be placed under a desired preload by adjusting ring nut 36 to compress resilient ring 37 axially. In so doing, bearing assembly 31 is shifted along bore 34 causing screw 30 to be shifted to the right as viewed in Figure 2 thereby pressing bearing assembly 32 to the bottom of bore 33. Further adjustment of clamping ring 36 preloads the anti-friction elements and maintains the same resiliently preloaded avoiding the possibility of axial movement of the screw while leaving the screw free for rotary movement.

Other components of the mechanism will be best understood by reference to Figure 4, wherein carriage 14 is shown as having a boss 40 projecting downwardly from its lower midportion and provided with a channel 41 snugly seating there a similarly shaped projection 42 extending from one edge of a rigid ring member 43. This ring is held fixedly and detachably to carriage 14, as by a pair of cap screws 44, 44. It will be understood that ring 43 is provided with a transverse bore 46 freely receiving screw 30 therethrough.

The means forming a power transmitting connection between the carriage-supported ring 43 and screw 30 comprises a pair of identical nut rings 48. Preferably each nut is held in freely rotating assembled relation with screw 30 by a closed circuit of recirculating balls 49 having a return ball loop 50 formed in the body of the nut in any well known manner. However, it is pointed out that more than one convolution of balls under load may be used between each nut ring 48 and the screw in lieu of the single convolution of balls under load here illustrated. To guide the balls as they transfer between the ends of the load convolution and the return ball loop 50 there is provided suitable pick-up pins 51, 51 fixed in bores formed in the nut rings and having appropriately shaped inner ends serving to guide the balls as they enter and exit from the return loop.

The means forming a power transmitting connection between nut rings 48, 48 and rigid member 43 includes a rigid bar 53 fixedly secured to the lower edge of ring 43, as by screws 54. The opposite ends of bar 53 project axially beyond the faces of ring 43 and have seated in their ends pins provided with cylindrical heads 55. These heads have a close fit with the side walls of slots 56 formed across the outer peripheries of nut rings 48. It is pointed out and emphasized that the described relationship between pin heads 55 and channels 56 permits limited shifting movement of the nuts relative to screw 30 and to locking bar 53 as necessary to permit uniform loading of balls 49 between the screw and the nut, while at the same time preventing relative rotary movement between the nut rings and rigid ring 43. Accordingly, it will be recognized that each nut may be move relative to the other and relative to ring 43 without changing their rotary positions relative to the screw.

To facilitate the automatic alignment of the nut assembly relative to the screw and to rigid member 43, there is preferably provided between one of nuts 48 and member 43 a pair of partially nested rings 60, 61 having spherically contoured contacting surfaces. One of the rings, as ring 60, bears against the face of member 43 whereas the other ring 61 seats against the shouldered end surface 62 of nut 48. Owing to the presence of the spherical surfaces between the two rings it will be understood that the nut may shift slightly relative to the screw.

Interposed between the other face of member 43 and the adjacent face of the right-hand nut 48 as viewed in Figure 4, is a resilient ring for maintaining the balls and the components of the mechanism resiliently under predetermined preload conditions while permitting the nut assembly to shift slightly as necessary to maintain uniformly distributed preload stresses on the individual balls. The resilient ring referred to, here illustrated, comprises an elastomeric ring 64 preferably having bonded to its opposite faces metal wafer rings 65, 65. Additionally, one or more thin shims 66 may be inserted between shoulder 62 of the nut and ring 65 as found desirable to compensate for variations in manufacturing tolerances and as necessary to preload the balls to a desired load stress when the nuts have been rotated in opposite directions sufficiently to bring slots 56, 56 into axial alignment with one another to seat the headed pins 55 of locking bar 53.

It will be understood that in the preloading of the unit during the assembly operation, the parts are assembled in the positions described above and illustrated in Figure 4 with the nuts being rotated in opposite directions and held in this position while the locking bar 53 is being secured in place by screws 54. Slots 56 are precisely positioned relative to the helical ball race of each nut to the end that the balls will be under preload when slots 56 of a pair of nuts 48 are aligned. It will be recognized from the foregoing that the automatically self-aligning rings 60 and 61 are firmly seated under axial pressure as is the resilient preloading ring 64, the latter serving to apply continuing preload pressure on each of the balls positioned between screw 30 and load grooves of nuts 48, 48. Those balls located in return loop 50 of each nut are free of preload but substantially a full convolution of the balls located in the load groove remain uniformly preloaded and locked in this condition by locking bar 53.

Another important feature of the ball bearing nut and screw mechanism is the provision of lubricant distributing and sealing means on the remote outer faces of nuts 48, 48. This seal is best shown in Figures 6 to 9 as comprising suitable resilient packing material, such as felt 70, and the like, which is sufficiently soft and pliant as to conform to the helical contour of the screw threads as the seal is rotatingly assembled over the end thereof. Mounted against the opposite radial faces of this ring are a pair of metallic wiper rings 71, 71 of thin flexible resilient material and having the configuration shown in Figures 8 and 9. The wiper rings are characterized by having one radial portion 72 bent to lie in an obtuse plane with respect to the adjacent annular portions of the ring. The inner radial edge of portion 72 is notched or cut away at 73 to straddle and closely embrace the crest of the helical convolutions of screw 30. The adjacent side wall lip portions 74, 74 of ring 71 are bent away from one another along a contour as to wipe the opposite side walls of a convolution crest as will be best understood by reference to Figure 4. It will therefore be recognized that the described wiper rings 71 cooperate with resilient packing material 70 to form a sealing ring, the inner annular surfaces of which conform to the exterior configuration of screw 30 throughout the circumference thereof and serve to wipe away excess lubricant leaving a desired film of lubricant of desired and uniform thickness, while at the same time preventing the leakage of lubricant from a reservoir thereof maintained between the two sealing rings. The described seal is housed within a closure cap 76 held assembled to the exterior faces of nuts 48 as by cap screws 77, the inner ends of which seat in threaded bores of nuts 48.

Referring to Figures 10 and 11 there is shown an alternate embodiment of the lubricant sealing and distributing ring. Since all other parts of the assembly are identical with those described above, the same reference characters have been applied to the corresponding parts. The sealing ring per se is shown in Figure 11 and comprises a homogeneous ring 80 of suitable elastomeric or plastic material molded to have the configuration there shown. The inner periphery of the ring is provided with a helical projection 81 having a surface contour complementing that of screw 30 and extending for at least one full convolution thereof and desirably somewhat further. The flanged periphery 82 of this seal is of slightly greater axial width than the seating well therefor within cap 76 in order that tightening of cap screws 77 will compress rim 82 slightly and form a fluid-tight seal between nut 48 and cap 76. The slight compression of the sealing ring thereby effected will also serve to form a firmer sealing contact with screw 30.

It is pointed out that the described ball bearing nut and screw mechanisms 27, 28 are both constructed in the manner just described and are adapted to be assembled as a unitary assembly between the carriage associated with each and the rigid support for the opposite ends of the screws.

Although the described structure need not be actuated by automatic sensing and actuating mechanisms, it is pointed out that the precision made possible by the described carriage feeding mechanism is such that the unit is admirably suited for this use. To this end, there would be provided a master program control unit of the electronic type designated generally 85 capable of transmitting position sensing information from each of the feed screw mechanisms and comparing it with master control information and then transmitting instantly and continuously proper corrective signals to control selsyn motors driving each of the screw mechanisms. One end of each screw 30 is connected through a shaft 86 with a position sensing unit 87, 87. This unit is designed to measure any angular change, however small, in the rotary position of screws 30 and transmit a signal indicative thereof to master program control unit 85. Connected to the opposite ends of screws 30 are driving selsyn motors 88, 88, each having suitable positive drive connections 89 with screws 30, 39. While not so shown in the drawing, it will be understood that each of motors 88 is fixedly mounted directly on the structure supporting the screw which it drives. Thus, motor 88 in Figure 1 will be mounted for movement bodily with carriage 14, whereas motor 88 shown in Figure 2 is stationarily supported on the machine tool bed 11.

Each selsyn motor and associated screw mechanism may be driven independently of the other or simultaneously therewith, as well as at the same or different rates. It follows that this capability together with the sensitivity of the position sensing units 87, the instantaneous response of the master program control and of the selsyn motors together with the complete absence of lost motion and backlash in the carriage feed mechanism makes it possible to position workpiece 22 precisely in any desired location relative to cutting tool 24. Although the present drawing does not so illustrate, it will be apparent that the spindle 90 supporting the cutting tool 24 may, and preferably is, adapted to be reciprocated axially thereof by a ball bearing nut and screw mechanism actuated by a selsyn motor and connected to the master program control unit 85 in the same manner described above in connection with the feed mechanisms for carriages 14 and 17 to the end that three-dimensional control information supplied to master control 85 will be effective to perform high-precision three-dimensional machining of workpiece 22. The finished result will be accurate as the control information supplied to master control 85.

Owing to the effective seals provided by the self-aligning rings 60, 61, by the preloading resilient assembly 64 and by the end seals 70, 70, the interior of mechanisms 27, 28 provide a substantially fluid-tight reservoir of limited capacity for a suitable low viscosity lubricant chargeable through a filling opening 90 (Figures 4, 10) and maintained at a suitable level in the reservoir.

Referring to Figures 12 to 14, there is shown a further preferred embodiment of the invention constructed and operated generally in accordance with the principles described in connection with the first two embodiments and differing essentially in that screw 30' is locked rigidly against both rotary and axial movement, and further in that the preloaded nut assembly is arranged to be rotated relative to the screw to advance a carriage or other mechanism connected thereto. The same or similar components of the last-mentioned embodiment will be understood as designated by the same reference characters used above but are distinguished by the addition of a prime.

Referring first to Figure 12 it is pointed out that the opposite ends of screws 30' are rigidly fixed to rigid support means 92 understood as interconnecting the opposite ends of the screw. As here shown, the means for fixing screw 30' to support 92 comprises a pin 93. The power-driven rotatable nut assembly includes a pair of ball bearing nut rings 48', 48' each held assembled to screw 30' by independent recirculating circuits of preloaded balls 49'. These are held locked in a desired preloaded condition by locking arm 53' fixedly secured to rigid ring member 43' by screws 44'. Interposed between one face of ring 43' and nut 48' is a resilient preload ring assembly 64' whereas the other nut is separated from the other face of ring 43' by the nesting self-aligning rings 60', 61'.

From Figure 12 it will be noted that the locking slots 56' seating the heads of pins 55' are located in flanged portion 94 of nut rings 48', 48'. The shoulder thus provided with the body of the nuts forms a seat for a pair of anti-friction bearing assemblies 95, 96, the inner races of which are firmly seated about the outer surfaces of nuts 48' in engagement with flanges 94. The outer races of these bearing assemblies have a sliding fit with the cylindrical side wall of bore 97 formed in a boss depending from the element to be moved as, for example, carriage 14' of a machine tool or the like. Bearings 95, 96 are held in preloaded condition by means of resilient preload rings 98, 98 similar to the resilient preloading rings 37 and 64' described above, rings 98, 98 being held compressed by adjustable nut ring 99 seated in the threaded outer end of bore 97.

Accordingly, it will be recognized that the described ball bearing nut unit is freely rotatable relative to stationary screw 30' without lost motion owing to the preloading provided in the manner described. This unit and its supporting bearings 95, 96 are located in a transverse opening through boss 40' of the carriage which latter bearings are likewise preloaded against backlash and lost motion.

The described ball bearing nut assembly is arranged to be rotated relative to the stationary screw 30' by a selsyn motor 88' having a positive driving connection 89' with one of the end caps 76' of the nut assembly. The driven gear of this drive may be secured to end cap 76' as by cap screws 100.

It is to be understood that the embodiment shown in Figures 12 to 14 may be applied to various operating environments, including machine tools of the type described in connection with the first embodiment, and that the selsyn motors for each of the feed devices can be connected to a master program control unit of the same type described above and operating in the same manner.

While the particular reciprocable feed mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Feed control mechanism for controlling the to-and-fro movement of a pair of superimposed carriages along a trackway therefor and transversely of one another, said mechanism including a first screw rotatably supported lengthwise of said trackway and a second screw rotatably supported transversely of said trackway, a rigid member encircling each of said screws and detachably fixed to an associated one of said carriages, ball bearing nuts independent of said rigid members positioned closely adjacent said rigid members and held assembled to the associated one of said screws by a recirculating circuit of balls, and means for holding the nuts on each screw rotated relative to one another and anchored to the adjacent one of said rigid members with said balls under a predetermined preload independently of externally applied loads, and each of said screws and the associated rigid member and pair of ball bearing nuts anchored thereto being installable and removable as a unitary assembly from its operating environment.

2. Feed control mechanism as defined in claim 1 characterized in that the rigid member associated with each of said screws includes means for detachably connecting the same to the adjacent one of said carriages whereby each of the screw and nut assemblies may be installed and detached as a unit without disturbing the preload condition of said balls.

3. Feed control mechanism as defined in claim 1 characterized in that said support for said first and second screws includes anti-friction bearing means mounted in rigid support means interconnecting the opposite ends of said screw, and means preloading said bearing means to hold said screws against axial shifting while leaving said screws free to rotate about their own axes.

4. Feed control mechanism as defined in claim 3 characterized in that said bearing preloading means is adjustable and includes resilient means interposed axially between said screws and the rigid support interconnecting the opposite ends of said screws.

5. Feed control mechanism as defined in claim 1 characterized in that said means for preloading said balls includes non-metallic resilient means bearing against said nuts in a manner tending to shift the same axially of said screw.

6. Feed control mechanism as defined in claim 1 characterized in the provision of resilient seal means disposed at the opposite axial end portions of said nuts and cooperating therewith and with the adjacent surface of said screw to maintain a film of lubricant distributed along the surface of said screw.

7. Feed control mechanism as defined in claim 1 characterized in that said means for holding said nuts in rotated preloaded condition includes means permitting said nuts to shift slightly relative to one another and to said rigid member as necessary to effect proper alignment thereof with said screws.

8. In combination with rigid bed means and a pair of carriages movably supported thereon, one of said carriages being movable to-and-fro along said bed means and the other carriage being movable to-and-fro in a parallel plane and transversely of the path of said one carriage, a pair of similar ball bearing screw and nut mechanisms associated one with each of said carriages for moving said carriages selectively to-and-fro relative to said bed means and relative to each other, and means independent of said carriages for maintaining each of said ball bearing screw and nut mechanisms preloaded to eliminate all backlash and lost motion between the parts thereof whereby the slightest reversal of relative rotary movement therebetween is effective to produce a corresponding relative movement of said carriages relative to one another, and readily disconnectible means for detachably holding each of said ball bearing screw and nut mechanisms rigidly fixed to an associated one of said carriages whereby each of said mechanisms can be connected and disconnected without disturbing the preadjusted positions of its preloaded components.

9. The combination defined in claim 8 characterized in that each of said screws extends transversely through rigid means detachably fixed to an associated one of said carriages.

10. The combination defined in claim 8 characterized in the provision of means for maintaining said screws substantially uniformly coated with lubricant.

11. The combination defined in claim 8 characterized in that each of said ball bearing screw and nut mechanisms includes a plurality of nuts with at least one disposed to the opposite sides of the associated rigid means, at least one resilient ring between one of said nuts and said rigid means, and means for fixedly locking said nuts of each mechanism in a predetermined position relative to one another wherein said resilient ring is maintained under compression to eliminate backlash between the nuts and screw of each mechanism.

12. In an automatically controlled machine tool of the type adapted to feed a workpiece through a predetermined path past a power-driven cutting tool in accordance with control signals supplied to carriage feeding means supporting the workpiece and wherein said carriage feeding means includes a pair of carriages movable in paths at right angles at one another; that improvement which comprises independent ball bearing screw and nut mechanisms each securable against the opposite end faces of rigid means detachably fixed to one of said carriages with the screw of each mechanism extending parallel to the axis of travel of one of said carriages, motor drive means for each of said screws, and means maintaining said mechanisms under preload whereby movement of either motor in either direction results in relative movement of said carriages of definite linear value, and readily disconnectible means for detachably holding each of said ball bearing screw and nut mechanisms rigidly fixed to an associated one of said carriages whereby each of said mechanisms can be connected and disconnected without disturbing the pre-adjusted positions of its preloaded components.

13. The combination defined in claim 12 characterized in that an associated pair of said mechanisms together with the intervening rigid means is detachable as a unit from the associated one of said carriages.

14. The combination defined in claim 12 characterized in that each of said mechanisms is adapted to be preassembled and preloaded to eliminate backlash between the parts thereof and to be assembled to and removed from one of said carriages without disturbing the preload condition thereof.

15. In a pair of superimposed carriages arranged for to-and-fro sliding movement transversely of one another and along a supporting rigid trackway, that improvement which comprises a pair of ball bearing nut and screw mechanisms one of which is interposed between said carriages and the other of which is interposed between said trackway and the adjacent one of said carriages, each of said ball bearing screw and nut mechanisms comprising a rigid mounting member having a transverse opening freely receiving a screw of said mechanisms, a screw extending through said opening, a plurality of ball bearing nut means assembled to said screw and disposed beside either face of said mounting member, means for locking said nut means in predetermined relative rotary positions, said locking means including self-aligning resilient means disposed between said nut means and the adjacent opposed faces of said mounting member.

16. A mechanism as defined in claim 15 characterized in that said resilient means includes an elastomeric ring encircling said screw and being placed under axial pressure by said locking means.

17. A mechanism as defined in claim 15 characterized in that said self-aligning means includes means providing a pair of nesting annular surfaces at least one of which is generally spherical contour.

18. A mechanism as defined in claim 15 characterized in the provision of lubricant seal and distributing means encircling said screw at the opposite exterior ends of said nut means, said seal means being resilient and contoured to seat within and to conform generally to the contour of said screw in excess of one full convolution thereof, said seal cooperating to spread a film of lubricant over the surface of the screw and to retain a charge of lubricant between said nut means as the screw rotates within said nut means.

19. A lubricant seal and spreader device for use on the screw of a ball bearing nut and screw mechanism, said device comprising a ring of resilient non-metallic material having an inner wall adapted to engage and conform to the grooved surface of a ball bearing type screw, and at least one metallic wafer ring having an inner diameter approximately the diameter of said screw at the bottom of its groove, the inner edge of said wafer ring having a notch adapted to receive and straddle the crest of the screw groove, and the adjacent inner edges of said wafer ring being deflected away from one another in a manner to seat against the opposite side walls between a groove crest, said resilient and metallic rings being adapted to be mounted in close side-by-side relation adjacent one face of ball bearing nut means and effective to spread a film of lubricant over the groove of an associated ball bearing screw.

20. A lubricant seal and spreader device for use on the screw of a ball bearing screw and nut mechanism, said device comprising a unitary one-piece ring molding of resilient material, said molding including an inwardly projecting helical wiper having an annular surface complemental in shape to the helically grooved surface of a screw with which said ring is to be used, said wiper being in wiping contact with said screw through at least one full convolution, the outer rim portions of said ring being adapted to be secured in fluid tight engagement to a ball bearing nut.

21. A ball bearing screw and nut mechanism including a helically grooved screw, a mounting ring encircling said screw having means for fixedly securing the same to a support, a pair of ball bearing nut means located one to either side of said mounting ring, self-aligning means having its opposite ends respectively against the adjacent faces of said nut means and of said mounting ring, a resilient ring having its opposite ends respectively against the adjacent faces of said mounting ring and the other of said nut means, and means carried by said mounting ring and engageable with each of said nut means for locking the latter in predetermined rotary positions wherein said resilient ring is placed under axial compression thereby placing said mechanism under predetermined resiliently maintained preload.

22. A ball bearing nut and screw mechanism comprising a screw having a helical groove forming a precision raceway for balls, preloaded thrust bearing means supporting said screws against axial movement, a pair of independent nuts held assembled to said screw by an associated closed circuit of recirculating balls, rigid means adjacent said nuts, resilient means bearing against the opposite faces of said rigid means and the face of the adjacent one of said nuts, and lock means carried by said rigid means and engageable with each of said nuts to hold the same axially spaced apart and rotated in opposite directions sufficiently to preload the balls of each nut against the juxtaposed portions of said screw groove, while permitting each of said nuts to move relative to said rigid means and relative to said screw to compensate misalignment of the rigid means relative to the screw axis.

23. A ball bearing nut and screw mechanism as defined in claim 22 characterized in the provision of means for rotating said nuts and said rigid means as a unit in either direction relative to said screw without disturbing the preloaded condition of the balls in said ball circuits.

24. A ball bearing nut and screw mechanism as defined in claim 22 characterized in the provision of means holding said screw fixed against both rotary and axial movement.

25. A ball bearing nut and screw mechanism as defined in claim 22 characterized in that said rigid means encircles said screw between said nuts, self-aligning means including resilient ring means positioned between said rigid means and said nuts, said lock means being operable to hold said nuts rotated toward one another from the opposite axial faces of said rigid means and in a manner to place said resilient ring means under axial compression.

26. A ball bearing nut and screw mechanism as defined in claim 25 characterized in that said lock means includes means permitting said nuts to shift slightly relative to said screw independently of one another without change in their relative rotary positions.

27. A ball bearing nut and screw mechanism as defined in claim 22 characterized in the provision of means supporting said screw axially to either side of said nuts, and carriage means supported for to-and-fro movement axially of said screw in response to the rotation of said nuts relative to said screw.

28. A ball bearing nut and screw mechanism as defined in claim 27 characterized in the provision of preloaded anti-friction bearings between the outer peripheries of said nut means and said carriage means.

References Cited in the file of this patent

UNITED STATES PATENTS

| | | |
|---|---|---|
| 1,500,270 | Rodel | July 8, 1924 |
| 2,119,705 | DeVlieg | June 7, 1938 |
| 2,195,799 | Parsons | Apr. 2, 1940 |
| 2,447,439 | Thompson | Aug. 17, 1948 |
| 2,508,281 | Miller et al. | May 16, 1950 |
| 2,623,403 | Terdina | Dec. 30, 1952 |
| 2,679,168 | Rokos | May 25, 1954 |
| 2,710,934 | Senn | June 14, 1955 |
| 2,749,812 | Wetzel | June 12, 1956 |
| 2,779,207 | Hamilton | Jan. 29, 1957 |
| 2,782,348 | Luhn | Feb. 19, 1957 |
| 2,820,187 | Parsons et al. | Jan. 14, 1958 |
| 2,842,007 | Brant | July 8, 1958 |

FOREIGN PATENTS

| | | |
|---|---|---|
| 1,062,878 | France | Dec. 9, 1953 |